United States Patent [19]

Christy et al.

[11] 4,095,745

[45] Jun. 20, 1978

[54] CONTINUOUS TUBE MULTIPLE EMITTER

[76] Inventors: Mark H. Christy, 1750 S. Zeyn St., Anaheim, Calif. 92802; Lloyd Spencer, 220 Patrician Way, Pasadena, Calif. 91105

[21] Appl. No.: 729,838

[22] Filed: Oct. 4, 1976

[51] Int. Cl.² .............................................. B05B 15/02
[52] U.S. Cl. .................................... 239/109; 239/542
[58] Field of Search ............... 239/107, 108, 109, 542, 239/547

[56] References Cited
U.S. PATENT DOCUMENTS

| 3,779,468 | 12/1973 | Spencer | 239/542 |
| 3,993,248 | 11/1976 | Harmony | 239/107 |

Primary Examiner—John J. Love
Attorney, Agent, or Firm—Lloyd Spencer; Mark Christy

[57] ABSTRACT

A continuous flow tube containing a series of emitters arranged to discharge through a wall of the flow tube, each emitter forming a flush flow passage collapsible to form a drip flow passage at a preselected low flow tube pressure; the emitters having side walls of such area with respect to the area of the flow tube, that when exposed transversely to initial flow through the flow tube the emitters form externally a series of flow restricting valves which rapidly raise the flow line pressure to a value at which drip flow occurs, thereby minimizing the number of emitters undergoing flush flow.

One embodiment of the emitter is adapted to be installed by forcing the emitter into the flow tube from the exterior thereof. Another embodiment utilizes a flow tube initially in the form of a web which receives the emitters and is then rolled into a tube with the margins of the web circumferentially overlapped and bonded. A further embodiment utilizes a circumferential extension of the web to form an insect guard for the emitter outlets.

The emitters being capable of modification to permit orientation edgewise to flow to minimize restriction to flow, for placement in the region adjacent the intake end of the flow tube, thereby to increase the total number of emitters for a given supply of water to the flow tube.

The embodiments also being capable of modification to provide a relatively rigid mounting base for the flexible emitter arranged to receive an insect guard cap or distributor tube of small dimension.

12 Claims, 32 Drawing Figures

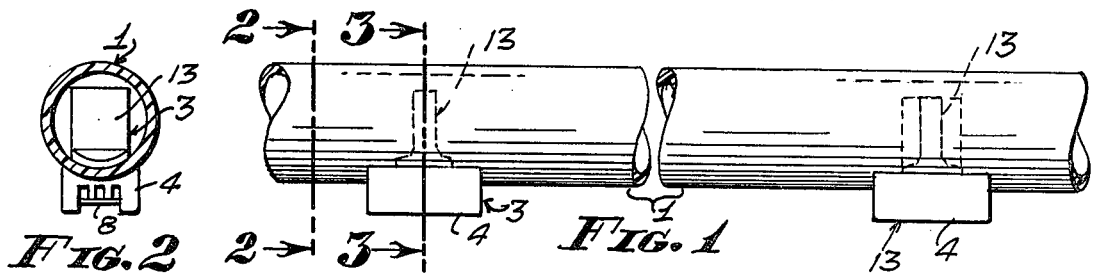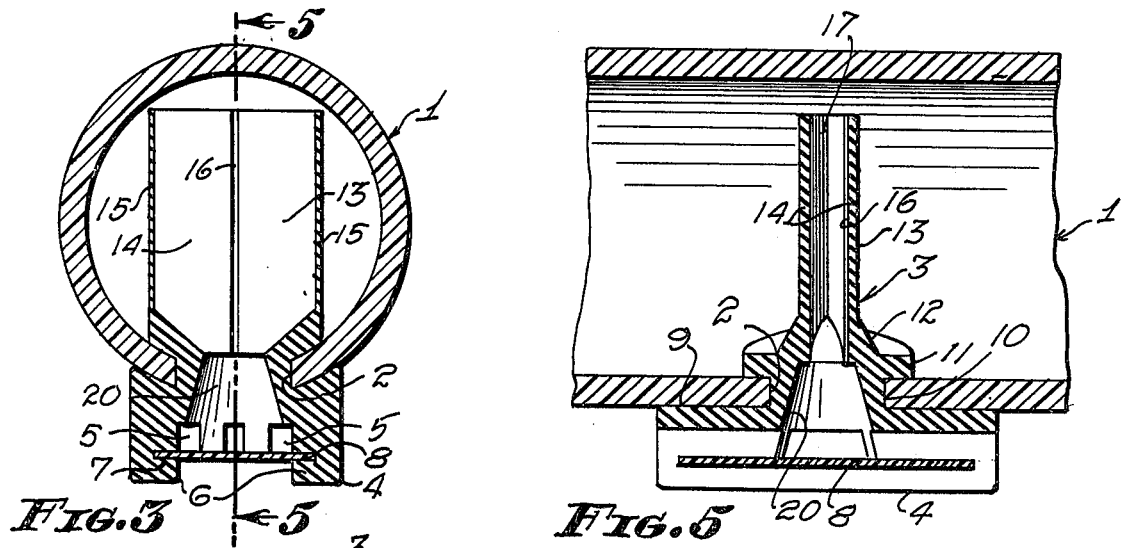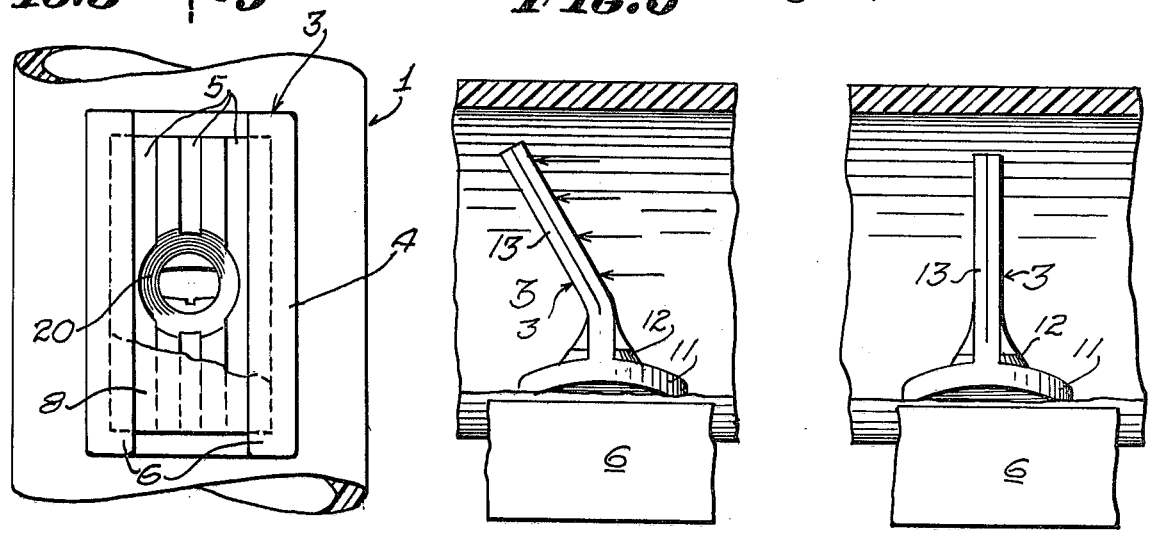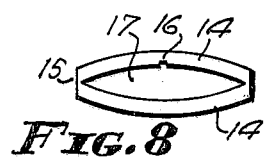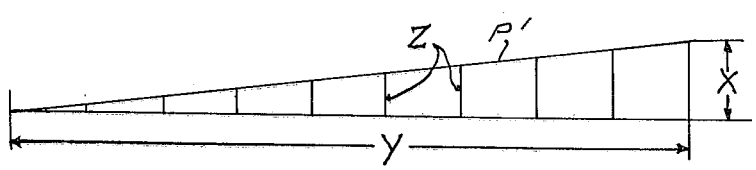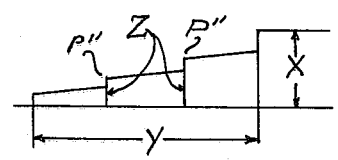

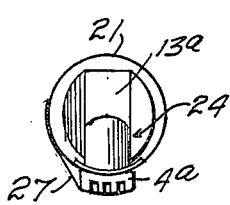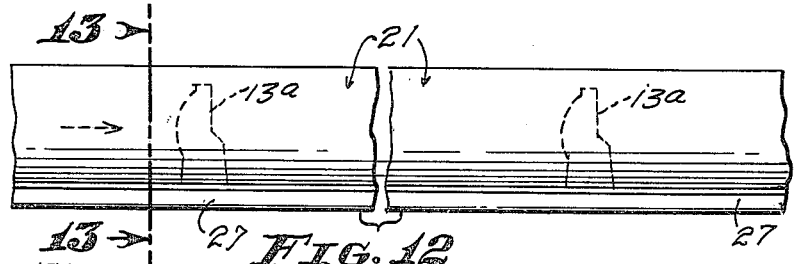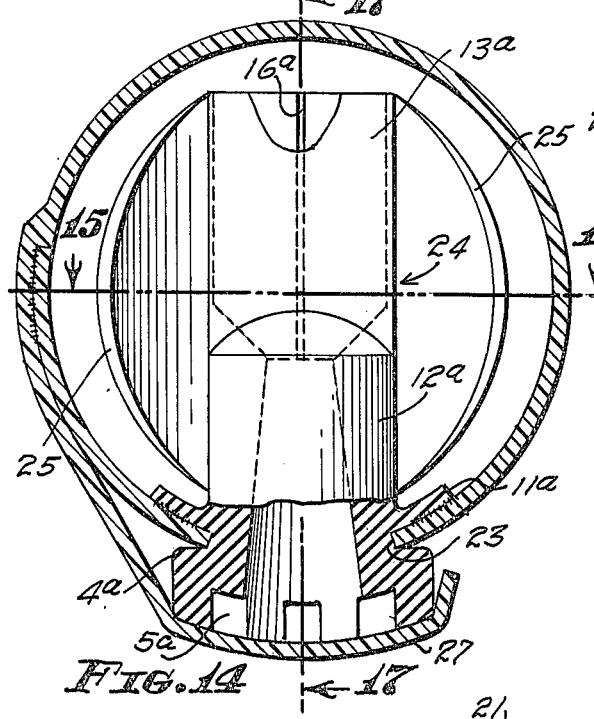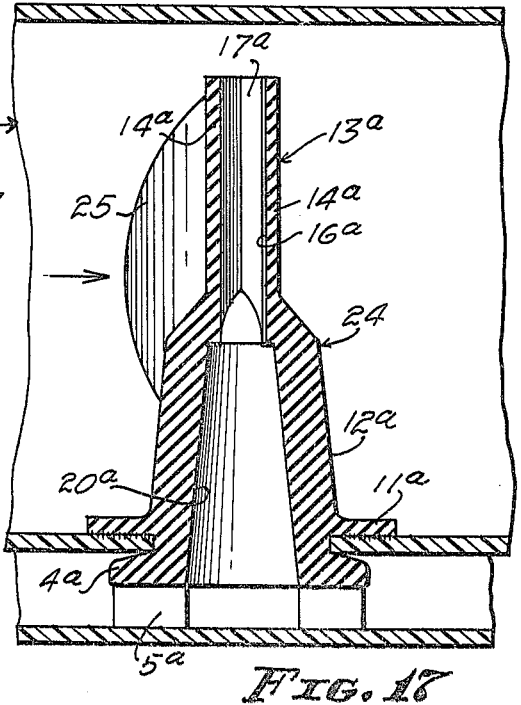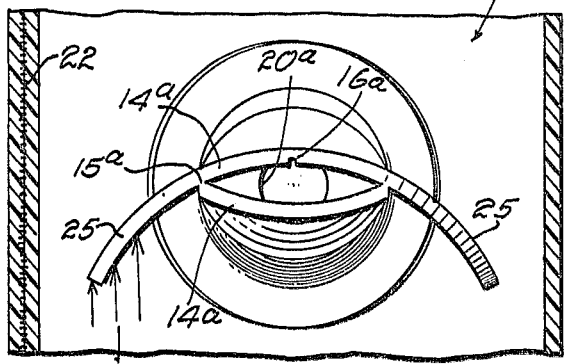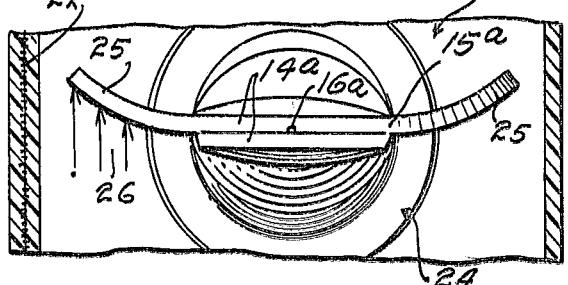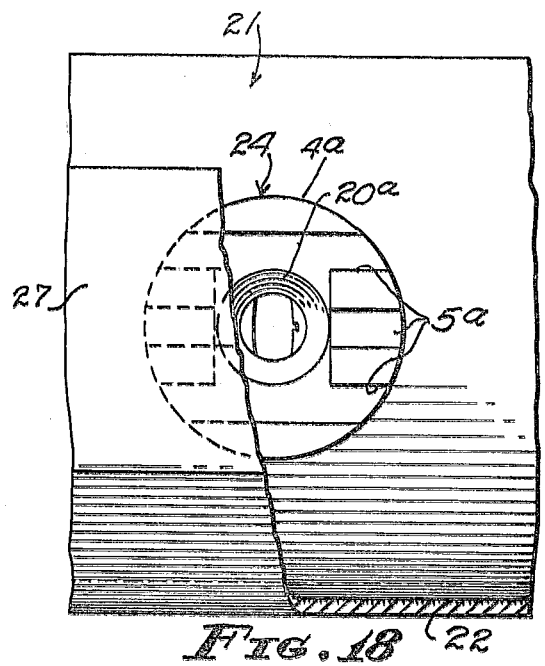

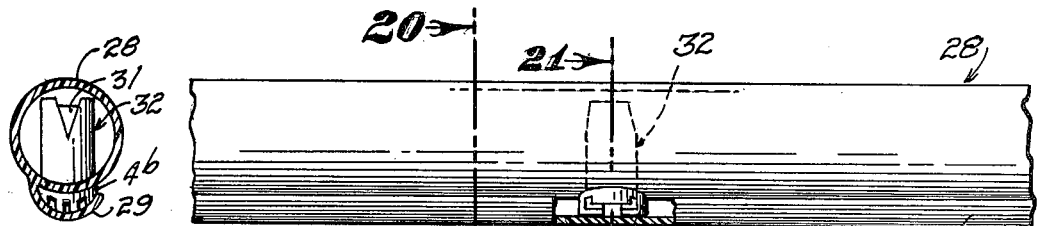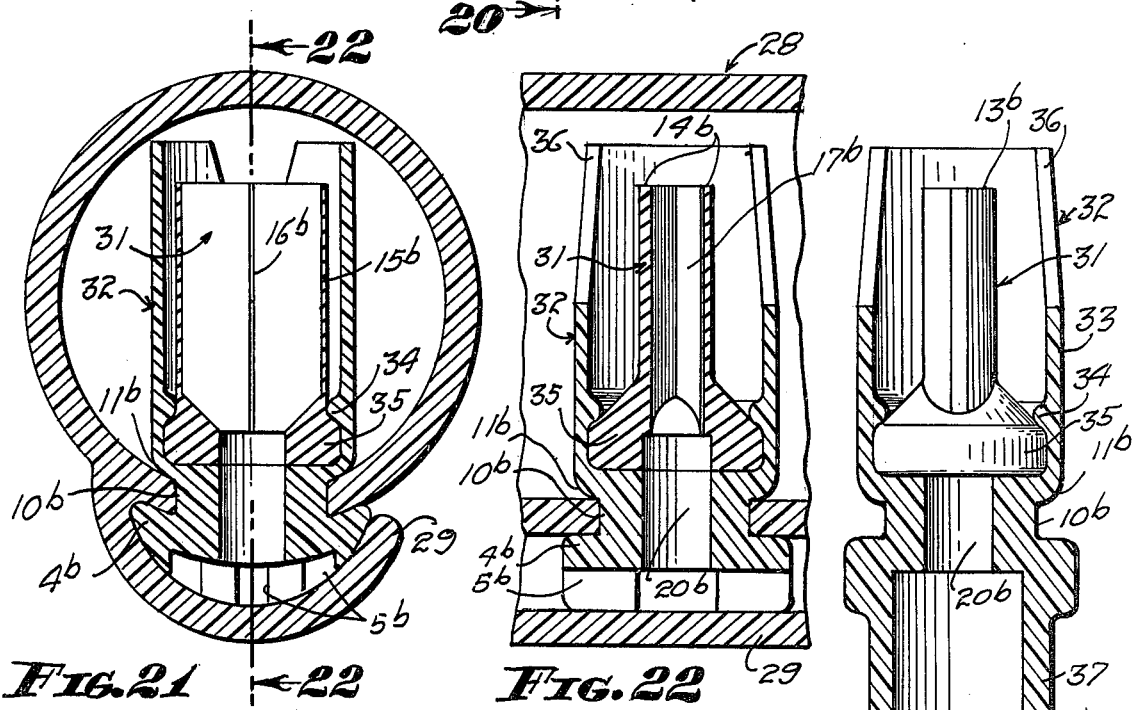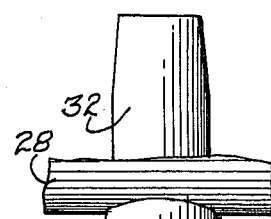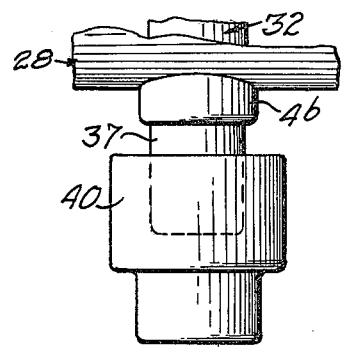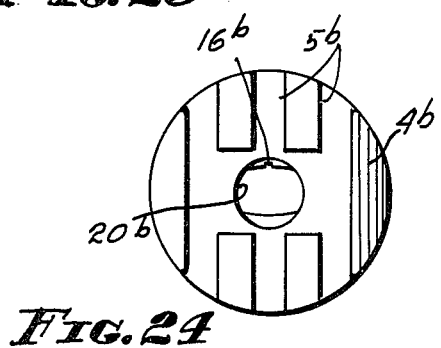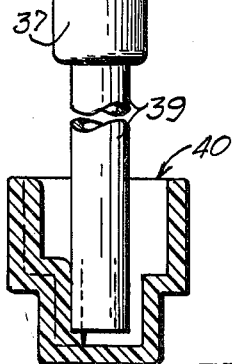

CONTINUOUS TUBE MULTIPLE EMITTER

BACKGROUND

The present invention is directed to emitters of the flush-drip type which are housed in a continuous tube and is related to the following patents and applications:

U.S. Pat. Nos. 3,797,754 and 3,779,468 and application Ser. No. 708,062.

SUMMARY

The present invention is a continuous tube multiple emitter which is summarized in the following objects:

First, to provide a continuous flow tube with internal emitters of the flush flow type wherein the emitters are novelly arranged to form in sequence and momentarily during initial flush flow, a series of flow restricting valves which cause the flow tube pressure to raise within a relatively short section of the flow line, thereby to minimize the number of emitters in flush condition, and to increase the number of emitters capable of use in a flow tube of given area and a given water supply therefore.

Second, to provide emitters for a continuous flow tube, as indicated in the previous object, wherein the emitters are capable of modification to permit orientation edgewise to flow, thereby minimizing flow restriction, such emitters being effective in the region of the flow tube adjacent its intake end to further increase the number of emitters for a given supply of water to the flow tube.

Third, to provide novel emitters which are relatively flat and capable of bending at low pressure in response to initial flow of water in the flow line, to effect a change from flush to drip flow and further reduce the number of emitters undergoing flush flow, it being noted that if the area of the flush flow passage is adequate, the duration of flush flow may be minimal when irrigation is initiated; that is, in the order of one second.

Fourth, to provide a continuous tube with internal emitters wherein the continuous tube is formed from a web of plastic material in which the web includes margins capable of being overlapped circumferentially and bonded, thereby permitting the emitters to be installed in the web prior to forming the web into a tube.

Fifth, to provide, as indicated in the previous object, a continuous tube for internally disposed emitters wherein one margin of the web may be widened to form a circumferentially extending insect guard for the discharge ends of the emitters.

DESCRIPTION OF THE FIGURES

FIGS. 1 through 11 illustrate one embodiment of the continuous tube multiple emitter in which:

FIG. 1 is an approximately full size fragmentary longitudinal view thereof.

FIG. 2 is a transverse view taken through 2—2 of FIG. 1 with the continuous tube in section and an emitter in side elevation.

FIG. 3 is an enlarged sectional view taken through 3—3 of FIG. 1.

FIG. 4 is an enlarged fragmentary view of the outlet end of an emitter, with the surrounding continuous tube shown fragmentarily.

FIG. 5 is an enlarged fragmentary sectional view taken through 5—5 of FIG. 3, showing an emitter in flush flow condition.

FIGS. 6 and 7 are enlarged fragmentary sectional views corresponding to FIG. 4 showing an emitter in drip flow condition.

FIGS. 8 and 9 are end views of an emitter respectively in flush flow condition and drip flow condition.

FIGS. 10 and 11 are diagrammatical views showing respectively, initial increase in flow tube pressure under normal conditions, and initial increase in flow tube pressure as accomplished by the present invention.

FIGS. 12 through 18 illustrate another embodiment of the continuous tube multiple emitter, in which:

FIG. 12 is an approximately full size fragmentary side view thereof.

FIG. 13 is an approximately full size transverse view taken through 13—13 of FIG. 12 with the continuous tube shown in section by a single line to illustrate the minimal wall thickness of the material comprising the tube, an emitter being shown in elevation.

FIG. 14 is an enlarged sectional view taken from essentially the same region as FIG. 13.

FIG. 15 is an enlarged sectional view of the continuous tube taken through 15—15 of FIG. 14 with the emitter being shown as in internal end view, in its full flow condition.

FIG. 16 is an enlarged view, corresponding to FIG. 15, showing the emitter in its drip flow condition.

FIG. 17 is an enlarged fragmentary sectional view taken through 17—17 of FIG. 14 showing the emitter in flush flow condition.

FIG. 18 is an enlarged fragmentary view showing the outlet end of an emitter, with a portion of an insect guard in section.

FIGS. 19 through 27 illustrate a further embodiment of the continuous tube multiple emitter, in which:

FIG. 19 is an approximately full size fragmentary side view thereof.

FIG. 20 is an approximately full size sectional view of the continuous tube taken through 20—20 of FIG. 19, with the emitter shown in side elevation.

FIG. 21 is an enlarged sectional view of the continuous tube and the emitter taken through 21—21 of FIG. 19, the continuous tube being shown fragmentarily.

FIG. 22 is an enlarged longitudinal sectional view thereof taken through 22—22 of FIG. 21, the continuous tube being shown fragmentarily.

FIG. 23 is an internal end view of the emitter shown in its flush flow condition.

FIG. 24 is an external end view of the emitter.

FIG. 25 is a longitudinal sectional view corresponding to FIG. 22 showing a modified construction wherein the external portion is provided with an attachment sleeve. FIG. 26 is a fragmentary side view of the modified emitter in which the attachment sleeve is fitted with an insect deterrent cap.

FIG. 27 is a side view of the modified emitter with a distributor shown fragmentary and capped with an insect deterrent cap.

FIGS. 28 through 32 illustrate another embodiment of the continuous tube multiple emitter, in which:

FIG. 28 is an approximately full size fragmentary side view thereof.

FIG. 29 is a sectional view of the continuous tube taken through 29—29 of FIG. 28, the emitter being shown in side elevation.

FIG. 30 is an enlarged sectional view taken through 30—30 of FIG. 28.

FIG. 31 is an enlarged sectional view taken through 31—31 of FIG. 30 with the continuous tube shown fragmentarily.

FIG. 32 is an enlarged end view of the emitter.

DETAILED DESCRIPTION

Figures 28, 29:
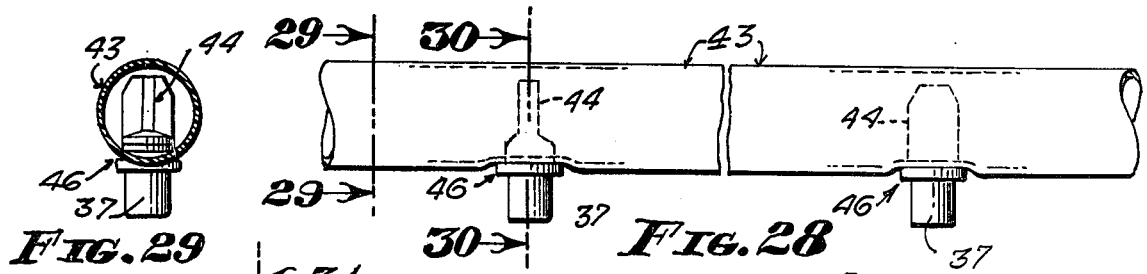

Referring to FIGS. 1 through 9, the embodiment of the continuous tube multiple emitter herein illustrated includes a flow tube 1 which may be a standard flexible plastic tube used in irrigation. For the purpose of this invention the flow tube is provided with a series of perforations 2, the spacing of which varies depending upon the crop to be irrigated. The perforations receive a series of emitters 3.

Each emitter includes an exposed base 4 which is shown as rectangular in shape with several longitudinal channels 5 bordered by side flanges 6 having confronting grooves 7 which receive the side margins of a small plastic cover plate 8. The opposite or inner side 9 of the base confronts the flow tube 1 and is curved in conformity thereto.

The inner side 9 of the base 4 is provided with a neck 10 dimensioned to be received in a flow tube perforation 2. The inner side of the neck is defined by a sealing flange 11 conforming to the inner surface of the flow tube 1. The sealing flange is joined to a transition portion 12 which merges into an emitter tube 13.

The emitter tube 13 is formed by a pair of confronting arched walls 14 joined at their lateral edges by thin webs 15. One of the walls is provided with a drip or trickle flow groove 16. In their normal state the walls 14 define a flush flow passage 17, which is collapsible at a predetermined low pressure in the flow tube 1 into mutual sealing contact except for the groove 16 which becomes a drip or trickle flow passage. Within the transition portion 12, the lower end of the flush flow passage is defined by a pair of downwardly converging end walls 19 which merge into a outlet passage 20 intersecting the channels 5.

The emitters 3 are molded from a highly elastomeric material having a shore hardness in the order of 40, and are installed by forcing the emitter tube 13, transition portion 12 and sealing flange 11 through the perforation 2. As the plate 8 is omitted during the insertion of the emitter, a tool may be inserted into the outlet passage 20 to stretch the neck 10 and cause the sealing flange 11 to assume it sealing position within the flow tube 1.

Operation of the embodiment shown in FIGS. 1 through 9 is as follows:

As indicated more fully in patent application Ser. No. 708,062, the dimensions and flexibility of the emitter tube are such as to cause collapse from flush to drip flow at a flow tube pressure preferably below two pounds per square inch (0.91/6.5 K/CM$^2$) difference between the flow tube pressure and the emitter tube internal pressure. If a flow rate of approximately 1 gallon per hour is desired, the dimensions for the drip passage are in the order of 0.020 × 0.015 inch (0.05 × 0.032 c). If a flow of fourth a gallon per hour is desired, the area of the drip passage is in the order of 0.010 × 0.0075 inch (0.025 × 0.016c). Relatively constant flow over a range of pressures is accomplished as the wall thickness and shore characteristics are selected to permit appropriate compression of the drip passage walls.

In order to install a maximum number of emitters in the flow tube, it is desirable to reduce to the minimum the flow tube pressure at which drip flow occurs. It should be noted that at the beginning of an irrigation cycle, flush flow may occur for only a fraction of a second, in order to flush out any foreign matter in the immediate vicinity of the emitter, for a previous flush period has occurred when the previous irrigation cycle terminated.

The flush flow period initiating an irrigation cycle is materially reduced by utilizing the exterior of the emitter tube as a flow reducing valve. More particularly, the emitter tube is of sufficient size with respect to the flow tube and is placed broadside or transverse to the axis of the flow tube, as shown in FIGS. 2 and 3, that flow is restricted a small amount. Consequently, a small pressure drop occurs across the emitter tube.

Referring to FIGS. 10 and 11, X represents the pressure at which transition to drip flow occurs; Y represents the length of flow tube under flush flow; and Z represents the individual emitters. If no pressure drop occurs across the emitters, the pressure rise is dependent of the rate at which water is supplied; that is, if slow, the rate of increase pressure is gradual as represented by the sloping line P'. If pressure drop occurs across the emitters the pressure increase rate is rapid as represented by the stepped line P''.

Another feature of the emitter tube 3 contributes to a minimum flush flow period. By reason of the fact that the minor dimension of the emitter tube 3 is relatively thin, it is readily deflected. When the emitter is deflected as indicated in FIG. 6 a mechanical closing force causing drip flow is exerted. Once the initial flow in the flow line is completed and all the emitters are under drip flow, the water demand is materially reduced permitting the emitters to return to their normal drip flow condition as shown in FIG. 7. This is made possible by the fact that the demand is materially less under drip flow then under flush flow.

For example, assuming an effective individual flush flow passage area including the outlet passage 20, as equal to: 0.01 sq. in. (0.0065 cm$^2$) and the drip passage area for 1 gallon per hour (4.55 liters) as: 0.02 × 0.015 inch or: 0.0003 sq. inch (0.00194 sq. cm), the ratio is approximately 33 to 1, not counting friction, which is a major factor in the drip passage. If a one-fourth gallon (1.14 liters) per hour is desired, the ratio is in the order of 133 to 1 with increased friction.

A further important factor should be noted. The need to reduce the number of emitters undergoing flush flow increases with increase in the number of emitters in operation. That is, as the distance from the inlet end of the flow line increases, the need for flow restriction increases. For example, the first one-fourth to one-half of the emitters may be oriented to minimize flow restriction by placing these emitters edgewise to flow as indicated by 3a at the right portion of FIG. 1. Also the orientation of the emitters to minimize or increase flow restriction may vary with the slope or change in slope of the flow line.

Referring to FIGS. 12 through 18, the embodiment here illustrated utilizes a continuous flow tube 21 formed from a web rolled into a cylindrical shape with a circumferentially overlapping portions 22 which are bonded together such as disclosed in U.S. Pat. No. 2,491,048. A tube thus formed may have a thinner wall than is practical by tubular extrusion. The thickness of the flow tube 21 is determined by the selected maximum pressure that may be needed. For ten pound per square inch (4.5 Kg) pressure, the wall thickness of the flow tube 21 may be in the order of 0.01 inch (0.025 cm) thick. If a larger maximum pressure is required the wall thickness of the flow tube 21 is increased proportionately. Because of the reduced wall thickness the wall is illustrated by a single line in FIG. 13. Appropriate perforations 23 are formed in the web before the web is rolled to form the tube 21.

As in the first described embodiment, each perforation 23 receives an emitter 24, which except for dimensions, and the fact that it may be mounted on the side of the web which becomes the inner side of the tube 21, is similar to the emitter 3. Each emitter 24 includes a base 4a, joined to a neck 10 dimensioned to be received in a perforation 23. The neck 10a is bordered by a sealing flange 11a which is bonded to the margin of the perforation 23. The flange is joined to a stem 12a which corresponds to the transition portion 12 of the emitter 3 and is joined to an emitter 13a. The emitter tube 13a is functionally the same as the emitter tube 13 and includes arched side walls 14a, connecting webs 15a and a drip flow groove 16a, the side walls normally forming a flush flow passage 17a merging into an outlet bore or passage 20a through a transition zone having converging walls 19a.

While the emitter tube 13a is illustrated as smaller than the emitter tube 13 with respect to the flow tube 21, and the stem 12a is longer than the transition zone 12, their respective dimensions could be similar or their dimensions reversed. To increase the effective flow control area, the emitter tube 13a and stem 12a may be provided with lateral fins 25. As shown in FIG. 5, the fins 25 form arcuate extensions of one of the side walls 14a, preferably without increasing the thickness of the web 14a as compared to the web 14.

The emitters 24 are so mounted with respect to the direction of flow in the flow tube 21, that the water moves in the direction of the arrows 26 in FIGS. 15 and 16, causing the fins 25 to exert a mechanical force sufficient to close the flush flow passage 17a at an early stage under the initial flush flow conditions. Also, as the fins and web become coplanar, a deflection of the emitter tube 24 may occur as illustrated in FIG. 6.

The exposed base 4a is smaller than the base 4, as the base 4a is intended to be forced through the corresponding perforation 23. In order to form an insect guard, one margin of the web forming the flow tube 21 may be extended circumferentially to form a guard web 27 which fits over the series of bases 4a. Each base 4a is provided with channels 5a.

Operation of the embodiment shown in FIGS. 12 through 18 is essentially the same as the first embodiment; that is, each embodiment accomplishes a materially reduced flush flow volume of water.

It should be noted that the emitters 24 are readily folded to one side by the tube forming mechanism in order to form the web into the tube 21 and bond the overlapping portions 22.

Referring to FIGS. 19 through 27, the embodiment here illustrated utilizes a continuous flow tube 28 which is shown as an extruded member with a cover web 29 and a series of perforations 30 underlying the web 29. In place of a single piece emitter, an emitter unit is provided which includes an emitter element 31 and a mounting element 32.

The mounting element 32 includes an exposed base 4b having channels 5b, an inner surface 9b confronting the flow tube 28, and a neck 10b dimensioned for reception into a perforation 30, corresponding to the similarly numbered reference characters of the previously described embodiments. The mounting element 32 differs in that it is formed of relatively rigid, high strength plastic material. Continuing from the neck 10b is a sleeve 33, having a lower end forming a sealing flange 11b. Near its lower end the sleeve 33 has an internal annular retainer rib 34.

The emitter element 31 includes a base portion 35 which is retained under the internal rib 34. The remainder of the emitter element 31 is similar to the previously described emitters, in the provision of arcuate side walls 14b, a drip flow groove 16b, flush passage 17b, bore 18b and sloping end walls 19b communicating with an outlet passage 20b in the mounting element 32.

The sleeve 33 serves to guide the emitter element through the perforation 30. For this purpose the extended portion of the sleeve is split as indicated by 36 and is capable of limited radial deflection. The dimensions of the sleeve is such as to provide a small pressure drop at each emitter unit to minimize the number of emitters in flush flow.

The web 29 covers the exposed base 4b and channels 5b to minimize exposure to insects and to permit the flow tube to be dragged over the soil or to be buried. The web 29, may however, be omitted and the exposed base 4b may be modified to form a tubular extension 37 having an internal retainer rib 38 which frictionally receives a distributor tube 39. A cap 40 is provided having two sets of internal ribs 41 and 42, one set being dimensioned to fit over the extension 37. This feature is more fully disclosed in copending application Ser. No. 708,062.

Referring to FIGS. 28 through 32, this embodiment includes a continuous flow tube 43 having perforations 44 each of which receives an emitter unit including an emitter element 45 and a mounting element 46, which, as in the embodiment shown in FIGS. 19 through 27, is formed of relatively rigid high strength plastic. The mounting element including an exposed base 4c, a neck 10c received in a perforation 44, and a sealing flange 11c.

It should be noted that the confronting surfaces of the base 4c and flanges 11c are planar; whereas the corresponding portions of the other embodiments conform to the flow tube curvature, however, may also be planar, as molded.

Continuing from the sealing flange 11c, a planar retainer channel 47 and retainer flange 48 is provided. The emitter element includes a base having an internal channel and flange respectively mating the flange 48 and channel 47. The emitter element further includes an emitter tube 13c having arcuate side walls 14c, connecting webs 15c, drip flow groove 16c, flush passage 17c, and sloping end walls 19c, forming an opening communicating with an outlet passage 20c in the mounting element 46.

Figures 30, 31:
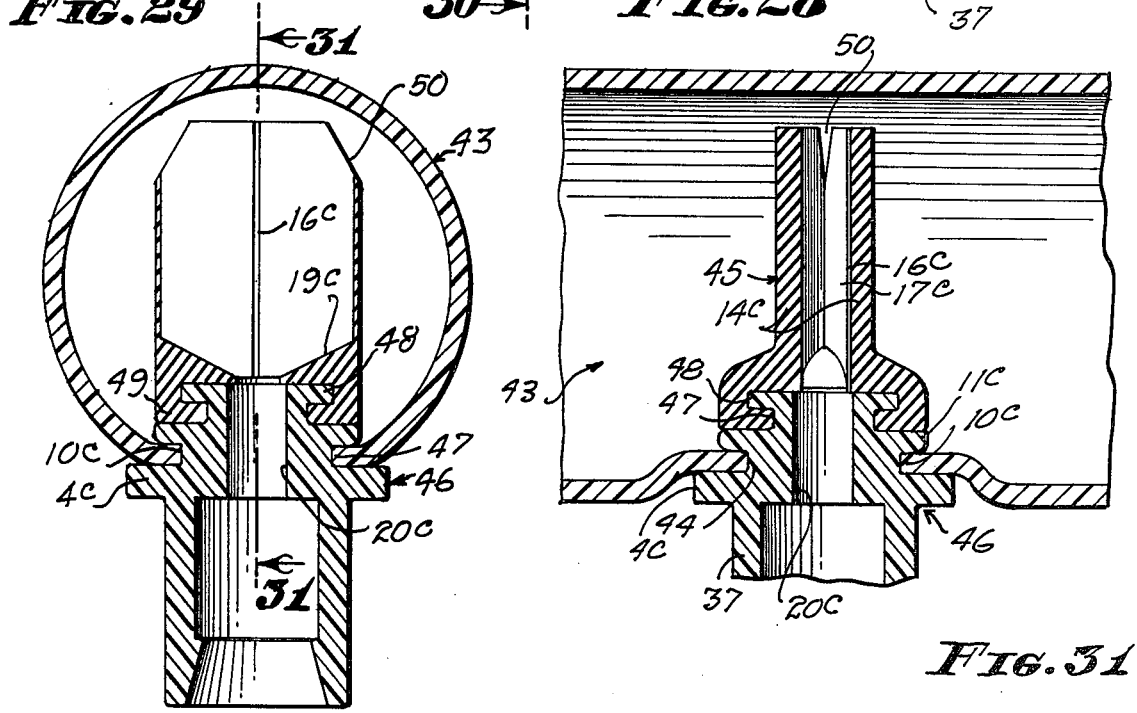
Figure 32:
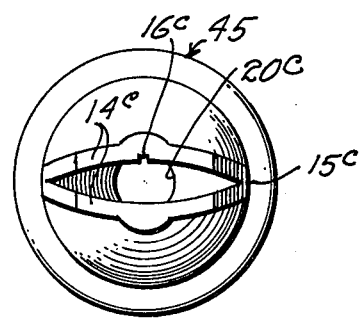

The major dimensions of the emitter tube are such that the emitter tube may function as a flow restricting valve when placed crosswise in the flow line 28 as shown in FIG. 31, or oriented as shown at the right of FIG. 28 to provide minimal restriction. Also early conversion to drip flow is accomplished by deflection of the emitter tube 14b in the manner of emitter tube 4 as shown in FIG. 6.

The flow tube 43 may be provided with a web 29 and the base 4c may be provided with channels as shown in FIGS. 19 through 22 or may be, as illustrated, provided with a tubular extension 37 as shown in FIGS. 25 through 27.

While webs 15, etc., are shown the upper portions of the webs may be slit providing sufficient length of web is maintained above the end walls 19, etc. Also the beveled or notched cuts may be made as indicated by 50 in FIGS. 28 through 32.

Having fully described our invention it is to be understood that we are not to be limited to the details herein set forth, but that our invention is of the full scope of the appended claims.

We claim:

1. A continuous tube multiple emitter, comprising:
   a. a continuous flow tube having a series of perforations therein;
   b. a series of emitters disposed in the flow tube for discharge therefrom through said perforations;
   c. each emitter forming a flush flow passage when exposed to flow tube pressure below a predetermined value and forming a drip flow passage when exposed to flow tube pressure above said predetermined value, each emitter having externally opposed surfaces of major area;
   d. each emitter adapted to be positioned in the flow tube to present a surface of major area essentially perpendicular to the axis of the flow tube thereby reducing the effective area of the flow tube, whereby, upon initiating an irrigation cycle, progressive sets of said emitters create a pressure drop across each emitter thereby accelerating rise in flow tube pressure to said predetermined value, thereby reducing the number of emitters undergoing flush flow; the emitters when in drip flow reducing the flow rate in the flow tube to minimize the pressure drop across each emitter.

2. A continuous tube multiple emitter as defined in claim 1, wherein:
   a. said maximum area is 40 to 80% of the flow tube area.

3. A continuous tube multiple emitter as defined in claim 1 wherein:
   a. each emitter including a coaxially disposed external base portion, a neck portion received in a corresponding perforation, a sealing flange, and an emitter tube, the emitter tube having opposed arched walls forming said flush passage and internally grooved to form, when collapsed, said drip passage, said arched walls defining said major area when oriented with respect to a plane perpendicular to the axis of the flow tube.

4. A continuous tube multiple emitter as defined in claim 3, wherein:
   a. the emitter is a single piece member formed of elastomeric material;
   b. and the emitter tube and sealing flange are radially compressible for insertion through a flow tube perforation.

5. A continuous tube multiple emitter as defined in claim 3, wherein:
   a. the flow tube is formed of a web member having circumferentially overlapping mutually bonded margins;
   b. the emitter is a single piece member formed of elastomeric material;
   c. the base portion is insertable outwardly through a perforation, and the seal flange is bonded to the interior of the flow tube.

6. A continuous tube multiple emitter as defined in claim 5, wherein:
   a. one margin of the mutual bond is circumferentially extended to form a continuous flap covering the external base portion of each emitter.

7. A continuous tube multiple emitter as defined in claim 3, wherein:
   a. the base portion, neck portion and sealing flange are formed of relatively rigid material, and the emitter tube is formed of elastomeric material, and means is provided for joining the emitter tube and sealing flange.

8. A continuous tube multiple emitter as defined in claim 7, wherein:
   a. an integral emitter tube extends from the sealing flange.

9. A continuous tube multiple emitter as defined in claim 3, wherein:
   a. fins extend laterally from the emitter to increase the effective area thereof.

10. A continuous tube multiple emitter as defined in claim 3, wherein:
    a. the arched walls define a flush passage having a minor width and a substantially greater major width whereby the emitter tube is readily deflectable in response to flow in the flow tube to cause conversion from flush to drip flow.

11. A continuous tube multiple emitter as defined in claim 3, wherein:
    a. the base portion includes an external extension including means for receiving a distributor tube.

12. A continuous tube multiple emitter, comprising:
    a. a single piece emitter including an emitter tube and means forming an outlet therefrom;
    b. the emitter tube having major sides and lateral edges defining a flush flow passage communicating with the outlet, the major sides being movable toward each other to collapse the flush flow passage;
    c. means forming, upon collapse of the flush flow passage, a drip flow passage communicating with the outlet;
    d. the emitter also being foldable about a transverse axis of the major sides to effect collapse and form the drip flow passage;
    e. a continuous flow tube having a series of perforations for receiving the outlet means of a series of emitters, the emitters being positioned with their major sides disposed transverse to the axis of the flow tube for exposure to flow of water through the flow tube initiating an irrigation cycle to cause an initial folding of the emitter tube and initial drip flow, the emitter tubes also being responsive to increased pressure in the flow tube to maintain drip flow.

* * * * *